(12) United States Patent
Sakai et al.

(10) Patent No.: US 12,030,239 B2
(45) Date of Patent: Jul. 9, 2024

(54) MOLDING MATERIAL, MOLDED PRODUCT, AND METHOD FOR PRODUCING MOLDED PRODUCT

(71) Applicant: MITSUBISHI CHEMICAL CORPORATION, Tokyo (JP)

(72) Inventors: Norihito Sakai, Tokyo (JP); Kenji Kato, Tokyo (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 398 days.

(21) Appl. No.: 16/441,756

(22) Filed: Jun. 14, 2019

(65) Prior Publication Data
US 2019/0291339 A1    Sep. 26, 2019

Related U.S. Application Data

(63) Continuation of application No. PCT/JP2017/045027, filed on Dec. 15, 2017.

(30) Foreign Application Priority Data

Dec. 15, 2016 (JP) .................................. 2016-242870

(51) Int. Cl.
*B29C 64/118* (2017.01)
*B33Y 70/00* (2020.01)
(Continued)

(52) U.S. Cl.
CPC ............ *B29C 64/118* (2017.08); *B33Y 70/00* (2014.12); *B29K 2023/086* (2013.01);
(Continued)

(58) Field of Classification Search
CPC ..... B29C 64/118; B29C 64/188; B33Y 10/00; B33Y 70/00; B33Y 80/00; B29K 2023/086; B29K 2029/00; B29L 2009/00
See application file for complete search history.

(56) References Cited

U.S. PATENT DOCUMENTS

2008/0169585 A1* 7/2008 Zinniel ................. B33Y 40/00
264/401
2016/0185050 A1    6/2016 Topolkaraev et al.
(Continued)

FOREIGN PATENT DOCUMENTS

DE    102015226022    6/2016
EP    3081590    10/2016
(Continued)

OTHER PUBLICATIONS

International Search Report in International Patent Application No. PCT/JP2017/045027, dated Feb. 27, 2018.
(Continued)

*Primary Examiner* — Mohammad M Ameen
(74) *Attorney, Agent, or Firm* — GREENBLUM & BERNSTEIN, P.L.C.

(57) ABSTRACT

The present invention provides a molding material excellent in dimensional stability and operation safety during surface treatment after molding. The molding material according to the present invention is for use in molding by a hot melt lamination method and contains an ethylene-vinyl alcohol copolymer.

7 Claims, 1 Drawing Sheet

(51) Int. Cl.
  *B29K 23/00* (2006.01)
  *B29L 9/00* (2006.01)
  *B33Y 10/00* (2015.01)
  *B33Y 80/00* (2015.01)

(52) U.S. Cl.
  CPC .......... *B29L 2009/00* (2013.01); *B33Y 10/00* (2014.12); *B33Y 80/00* (2014.12)

(56) References Cited

U.S. PATENT DOCUMENTS

| | | | | |
|---|---|---|---|---|
| 2016/0237267 | A1* | 8/2016 | Usui | C08L 23/0861 |
| 2016/0303768 | A1* | 10/2016 | Usui | B29B 9/16 |
| 2016/0361868 | A1* | 12/2016 | Wang | B33Y 50/02 |
| 2018/0362288 | A1* | 12/2018 | Kim | B65H 49/32 |

FOREIGN PATENT DOCUMENTS

| | | |
|---|---|---|
| JP | 2010-515606 | 5/2010 |
| JP | 2016-060147 | 4/2016 |
| JP | 2016-165884 | 9/2016 |
| JP | 2016-532579 | 10/2016 |
| WO | 2012-058278 | 5/2012 |
| WO | 2015/120596 | 8/2015 |
| WO | 2015/193819 | 12/2015 |
| WO | WO-2015-193819 A2 * | 12/2015 |

OTHER PUBLICATIONS

Written Opinion of the International Searching Authority issued in International Application No. PCT/JP2017/045027, mailed Feb. 27, 2018 (English translation attached to IPRP, below).
English translation of IPRP issued in International Application No. PCT/JP2017/045027, dated Jun. 18, 2019.
Office Action issued in EP Patent Application No. 17880861.4 dated Apr. 30, 2021 (previously submitted).
European Extended Search Report for EP App. No. 17880861.4 dated Apr. 30, 2021.
European Extended Search Report for EP App. No. 17880861.4 dated Nov. 19, 2019.
Office Action issued in JP Patent Application No. 2017-565876, Jun. 15, 2021, English translation.
Office Action issued in European Patent Application No. 17880861.4, Feb. 9, 2022.

* cited by examiner

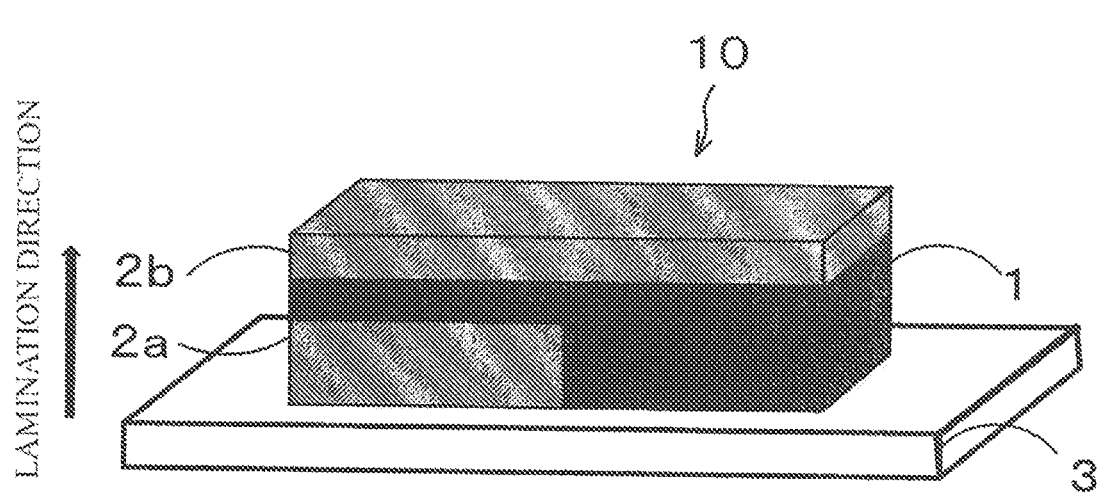

MOLDING MATERIAL, MOLDED PRODUCT, AND METHOD FOR PRODUCING MOLDED PRODUCT

CLAIM FOR PRIORITY

This application is a Continuation of PCT/JP2017/045027 filed Dec. 15, 2017, and claims the priority benefit of Japanese application 2016-242870 filed Dec. 15, 2016, the contents of which are expressly incorporated by reference herein in their entireties.

TECHNICAL FIELD

The present invention relates to a molding material for use in laminate molding, and particularly to a molding material for obtaining a molded product to be molded using a three-dimensional molding apparatus, a molded product molded from the molding material, and a method for producing the molded product.

BACKGROUND ART

Laminate molding is a method of molding a solid having a predetermined structure, in which a material in a flowing state is solidified instantaneously after being extruded, and an article is molded by further laminating materials thereon. A hot melt lamination method is simple and inexpensive, and as a molding resin used in this method, thermoplastic resins such as polylactic acid (PLA), an acrylonitrile-butadiene-styrene copolymer resin (ABS), a polyamide, and a polycarbonate are known (see, for example, Patent Document 1).

PRIOR ART DOCUMENT

Patent Document

Patent Document 1: WO 2012/58278

SUMMARY OF INVENTION

Problem that the Invention is to Solve

However, in a case of using, as a material, the thermoplastic resin proposed so far in the hot melt lamination method, there is room for improvement in the dimensional accuracy of the molded product.

In addition, during surface treatment after molding, the molded product molded by using the thermoplastic resin proposed so far needs to be polished with a file and an alkaline solvent or an organic solvent needs to be used, so that there is room for improvement in work safety.

An object of the present invention is to provide a molding material for use in molding by a hot melt lamination method with such a problem solved.

Means for Solving the Problem

As a result of intensive study considering the above circumstances, it is found that the above problem is solved by using an ethylene-vinyl alcohol copolymer (hereinafter sometimes referred to as EVOH). Thus, the present invention has been completed.

That is, the present invention is characterized in the following (1) to (6).

(1) A molding material for use in molding by a hot melt lamination method, the molding material containing an ethylene-vinyl alcohol copolymer.

(2) The molding material according to (1), wherein a content of an ethylene structural unit in the ethylene-vinyl alcohol copolymer is 20 mol % to 50 mol %.

(3) A molded product containing the molding material according to (1) or (2).

(4) A method for producing a molded product, the method including: performing a hot melt lamination method using the molding material according to (1) or (2), to obtain a molded product.

(5) The method for producing a molded product according to (4), including performing surface treatment with at least one selected from the group consisting of water, an alcohol and a mixed solvent thereof.

(6) Use of an ethylene-vinyl alcohol copolymer as a molding material for use in molding by a hot melt lamination method.

Since the EVOH has a lower molecular weight and a lower melt tension than other thermoplastic resins, those skilled in the art usually consider that it is inappropriate to use the EVOH in the hot melt lamination method, since the EVOH cannot be laminated as designed in the method. However, the inventors of the present invention focus on the crystallinity of the EVOH. Since the EVOH has a high crystallization rate, molding can be achieved without unexpected shape deformation. Further, the EVOH can be easily surface-treated with an alcohol, a water/alcohol mixed solvent or the like, and there is no need to use an alkaline solvent or organic solvent.

Effects of the Invention

In the present invention, by using the EVOH, a molding material can be obtained, which is excellent in dimensional accuracy, can be subjected to surface treatment without using an alkaline solvent or an organic solvent, and is thus suitable for molding by a hot melt lamination method. That is, the molding material according to the present invention is excellent in dimensional stability of the molded product and operation stability during surface treatment after molding.

BRIEF DESCRIPTION OF THE DRAWINGS

FIG. 1 is a schematic view of a molded product produced in Examples.

MODE FOR CARRYING OUT THE INVENTION

Hereinafter, the present invention will be described in detail.

In this description, all percentages and parts expressed by mass are the same as percentages or parts expressed by weight.

The molding material according to the present invention is for use in molding by a hot melt lamination method and contains an ethylene-vinyl alcohol copolymer (EVOH).

Hereinafter, the EVOH will be described in detail.

[Ethylene-Vinyl Alcohol Copolymer]

The EVOH used in the present invention is a resin conventionally called an ethylene-vinyl alcohol copolymer or a saponified ethylene-vinyl ester copolymer, is usually a resin obtained by saponifying a copolymer of ethylene and a vinyl ester monomer (ethylene-vinyl ester copolymer) and is a water-insoluble thermoplastic resin.

Polymerization can be performed by any known polymerization method such as solution polymerization, suspension polymerization and emulsion polymerization, and solution polymerization using methanol as a solvent is generally used.

The saponification of the obtained ethylene-vinyl ester copolymer is also known, and can be performed by using a known method.

The EVOH thus produced mainly contains an ethylene-derived structural unit and a vinyl alcohol structural unit, usually with a small amount of a vinyl ester structural unit remaining without being saponified.

Vinyl acetate is typically used as the above vinyl ester monomer from the viewpoint of market availability and good impurity treatment efficiency in production.

Examples of other vinyl ester monomers include aliphatic vinyl esters such as vinyl formate, vinyl propionate, vinyl valerate, vinyl butyrate, vinyl isobutyrate, vinyl pivalate, vinyl caprate, vinyl laurate, vinyl stearate and vinyl versatate, aromatic vinyl esters such as vinyl benzoate, or the like. Aliphatic vinyl esters having usually 3 to 20 carbon atoms, preferably 4 to 10 carbon atoms, and more preferably 4 to 7 carbon atoms can be used.

The vinyl ester monomer is usually used alone, but plural types thereof may be used at the same time, if necessary.

The content of the ethylene structural unit in the EVOH is a value measured according to ISO 14663, and is usually 5 mol % to 60 mol %, preferably 20 mol % to 50 mol %, and more preferably 25 mol % to 45 mol %.

In a case where the content is too low, the interlayer adhesion force tends to decrease during laminate molding; in a case where the content is too high, the flexibility of the filament is too high, and the filament tends to be unable to be fed into the heater.

The saponification degree of the vinyl ester component in the EVOH is a value measured according to JIS K6726 (wherein the EVOH is a solution uniformly dissolved in a water/methanol solvent (water:methanol=9:1 (mass ratio)), and is usually 90 mol % to 100 mol %, preferably 95 mol % to 100 mol %, and more preferably 99 mol % to 100 mol %.

In a case where the saponification degree is too low, the gas barrier property, thermal stability, moisture resistance and the like tend to be lowered.

A melt flow rate (MFR) (under 210° C. and a load of 2,160 g) of the EVOH is usually 0.5 g/10 min to 50 g/10 min, preferably 1 g/10 min to 35 g/10 min, and more preferably 2 g/10 min to 6 g/10 min.

In a case where the MFR is too large, the resin tends to sag from the nozzle; in a case where the MFR is too small, the viscosity is too high, the resin cannot be stretched into a uniform layer shape, and laminate molding tends to be difficult.

The EVOH may further contain structural units derived from the following comonomers, in addition to the ethylene structural units and the vinyl alcohol structural units (containing unsaponified vinyl ester structural units).

Examples of the comonomer include: α-olefins such as propylene, isobutene, α-octene, α-dodecene, and α-octadecene; hydroxy group-containing α-olefins such as 3-butene-1-ol, 4-pentene-1-ol and 3-butene-1,2-diol or hydroxy group-containing α-olefin derivatives such as esterified products and acetylated products thereof; hydroxyalkyl vinylidenes such as 2-methylenepropane-1,3-diol and 3-methylene pentane-1,5-diol; hydroxyalkyl vinylidene diacetates such as 1,3-diacetoxy-2-methylene propane, 1,3-dipropionyloxy-2-methylene propane, and 1,3-dibutyronyloxy-2-methylene propane; unsaturated carboxylic acids or salts thereof, partial alkyl esters, complete alkyl esters, nitriles, amides or anhydrides; unsaturated sulfonic acids or salts thereof; vinylsilane compounds; vinyl chlorides; and styrenes.

Further, an EVOH resin modified after being urethaned, acetylated, cyanoethylated, oxyalkylenated and the like can be used. Among the above modified products, the EVOH resin in which a primary hydroxyl group is introduced into the side chain by copolymerization is preferred from the viewpoint of improving the secondary moldability such as stretching treatment and vacuum/pressure forming. An EVOH resin having a 1,2-diol structure in the side chain is particularly preferred.

The EVOH may contain a compounding agent generally incorporated in the EVOH within the range not inhibiting the effect of the present invention, such as a thermal stabilizer, an antioxidant, an antistatic agent, a colorant, an ultraviolet absorber, a lubricant, a plasticizer, a light stabilizer, a surfactant, an antibacterial agent, a desiccant, an anti-blocking agent, a flame retardant, a crosslinking agent, a curing agent, a foaming agent, a crystal nucleating agent, an antifogging agent, an additive for biodegradation, a silane coupling agent, and an oxygen absorbent.

In addition, the EVOH may be a mixture with another different EVOH. Examples of another EVOH include those having different ethylene contents, having saponification degrees, having different degrees of polymerization, having different other copolymerization components, or having different contents of 1,2-diol structural units.

The EVOH used in the present invention may contain other thermoplastic resins depending on the purpose. In the case of containing other thermoplastic resins, the content of other thermoplastic resins is usually less than 30 mass % with respect to the whole resin composition.

In addition, other compounding components may be contained depending on the purpose within the range not inhibiting the effect of the present invention. The addition amount of the compounding agents is usually less than 5 mass % with respect to the resin composition. Examples of other compounding components include fillers such as talc, calcium carbonate, mica and glass fibers, plasticizers such as paraffin oil, an antioxidant, a thermal stabilizer, a light stabilizer, an ultraviolet absorber, an oxygen absorber, a neutralizer, a lubricant, an antifogging agent, an anti-blocking agent, a slip agent, a crosslinking agent, crosslinking aid, a colorant, a flame retardant, a dispersant, a surfactant, a desiccant, an antistatic agent, an antibacterial agent, a curing agent, a foaming agent, a crystal nucleating agent, an additive for biodegradation, a fluorescent whitening agent, and a silane coupling agent. One or two or more types of arbitrary compounding components may be contained.

Such resins and compounding agents which can be contained means uniform addition to the resin component (uniform addition in the pellet).

The thermal stabilizer is added for the purpose of improving various physical properties such as thermal stability during melt molding, and additives including: organic acids such as acetic acid, propionic acid, butyric acid, lauric acid, stearic acid, oleic acid, and behenic acid, or salts thereof, such as alkali metal (sodium, potassium and the like) salts, alkaline earth metal (calcium, magnesium and the like) salts; or inorganic acids such as sulfuric acid, sulfurous acid, carbonic acid, phosphoric acid, and boric acid, or salts thereof, such as alkali metal (sodium, potassium and the like) salts, alkaline earth metal (calcium, magnesium and the like) salts, and zinc salts, may be added. Among these, it is particularly preferable to add an acetic acid, a boron compound, an acetate or a phosphate.

In the case of adding acetic acid, the addition amount thereof is usually 0.001 part by mass to 1 part by mass, preferably 0.005 part by mass to 0.2 part by mass, and particularly preferably 0.01 part by mass to 0.1 part by mass, with respect to 100 parts by mass of the EVOH. When the addition amount of acetic acid is too small, the effect of containing acetic acid tends not to be sufficiently obtained; when the addition amount of acetic acid is too large, it tends to be difficult to obtain a uniform molded product.

In the case of adding the boron compound, the addition amount thereof is usually 0.001 part by mass to 1 part by mass, preferably 0.002 part by mass to 0.2 part by mass, and particularly preferably 0.005 part by mass to 0.1 part by mass, in terms of boron equivalent to 100 parts by mass of the EVOH (after ashing, analyzed by ICP emission spectrometry). When the addition amount of the boron compound is too small, the effect of adding the boron compound may not be sufficiently obtained; when the addition amount of the boron compound is too large, it tends to be difficult to obtain a uniform molded product.

In addition, the addition amount of acetate and phosphate (including hydrogen phosphate) is usually 0.0005 part by mass to 0.1 part by mass, preferably 0.001 part by mass to 0.05 part by mass, and particularly preferably 0.002 part by mass to 0.03 part by mass, in terms of metals equivalent 100 parts by mass of the EVOH (after ashing, analyzed by ICP emission spectrometry). When the addition amount is too small, the effect of containing theses components may not be sufficiently obtained; when the addition amount is too large, it tends to be difficult to obtain a uniform molded product. In a case where two or more kinds of salts are added to the EVOH resin, it is preferable that the total amount thereof is within the above addition amount range.

[Molding Material]

The molding material according to the present invention contains EVOH as a main component. Here, main component means a component occupying 50 mass % or more of the whole molding material based on the mass. The content of the EVOH in the molding material is preferably 70 mass % or more, more preferably 80 mass % or more, and most preferably 100 mass % in the molding material.

Since the molding material is usually formed in a strand shape and installed in a laminate molding apparatus in a state of a filament wound around the reel, flexibility and toughness to the extent that the molding material does not break even when wound around the reel may be required. In this case, it is preferable to use an EVOH having a high ethylene content or to blend a flexible component with the EVOH.

Examples of the flexible component include thermoplastic resins, and examples of the thermoplastic resins include a polyolefin resin, a polyester resin, a polyamide resin, an acrylic resin, a polyvinyl resins (such as polyvinyl acetate, and polyvinyl chloride), and a thermoplastic elastomer.

Examples of the thermoplastic elastomer include a urethane elastomer, an ester elastomer, and a styrene elastomer. Preferred is a block copolymer having a polymer block of an aromatic vinyl compound and a polymer block of a conjugated diene compound and/or a hydrogenated block thereof. Preferred is a block copolymer having a functional group capable of reacting with a hydroxyl group from the viewpoint of imparting toughness, and the functional group is preferably an acid. The acid value thereof is preferably 1 mg $CH_3COONa/g$ to 10 mg $CH_3COONa/g$, and more preferably 2 mg $CH_3COONa/g$ to 5 mg $CH_3COONa/g$. Examples of a method for measuring the acid value include a neutralization titration method for determining the alkali consumption amount required for neutralization.

The addition of the flexible component is preferably 5 mass % to 50 mass %, more preferably 10 mass % to 40 mass %, and particularly preferably 15 mass % to 35 mass %, with respect to the EVOH.

In addition, a plasticizer may be added to the molding material, and the addition amount of the plasticizer is preferably small, and is preferably 20 mass % or less, more preferably 10 mass % or less, still more preferably 5 mass % or less, and particularly preferably 3 mass % or less, in order to stabilize the shape of the molded product according to the present invention.

In addition to the above components, well-known additives such as a filler, an antioxidant, a colorant, an antistatic agent, an ultraviolet absorber, and a lubricant can be properly compounded.

The melt viscosity of the molding material is 0.2 g/10 min to 25 g/10 min, preferably 1 g/10 min to 15 g/10 min, and more preferably 2 g/10 min to 6 g/10 min, at a melt flow rate measured according to JIS K7210 under 210° C. and a load of 2,160 g.

The optimum filament diameter of the molding material is determined by an apparatus, and is usually 0.1 mm to 5 mm, preferably 1 mm to 4 mm, and particularly preferably 1.5 mm to 3.5 mm. In a case where the diameter is too large, the nozzle tends to be clogged; in a case where the diameter is too small, the amount of the resin extruded from the nozzle tends to be too small.

[Method for Producing Molded Product, and Molded Product]

A method for producing a molded product using the molding material according to the present invention will be described.

A known laminate molding apparatus can be used in laminate molding. As the laminate molding apparatus, usually a dual-head-type laminate molding apparatus having a plurality of heads capable of extruding a molding material (hereinafter referred to as a main material) for laminate molding and a support material as desired can be used, for example, FDM-200HW-X manufactured by Ninjabot Company, CREATE manufactured by FlashForge. co., Eagleed manufactured by Reis Enterprise CO., LTD., MBot Grid II manufactured by 3D Systems, and UPrint SE manufactured by Stratasys Co.

Filaments of the main material and the support material are respectively supplied to the heads of the laminate molding apparatus, heated and melted by the head portion, and laminated so as to be pressed against the platform from each nozzle, and the layers are laminated in a plurality of layers, so as to produce a molded product (laminate molded product).

For the molding material containing the EVOH of the present invention, the temperature of the head portion in the laminate molding apparatus is usually 150° C. to 270° C., preferably 180° C. to 250° C., and particularly preferably 190° C. to 240° C. The pressure of the head portion is usually 200 psi to 1000 psi, and preferably 400 psi to 800 psi. The lamination pitch is usually 10 μm to 350 μm, preferably 50 μm to 250 μm, and particularly preferably 100 μm to 220 μm. In a case where the values are in the above ranges, a molded product having better quality tends to be obtained.

As described above, the support material is removed from the laminate made of the main material and the support material as desired, so as to obtain a final molded product.

Since the molding material containing the EVOH according to the present invention has abundant hydroxyl groups, it is particularly preferable to use the molding material in combination with a molding material obtained by using a polyvinyl alcohol resin. In a case where a molding material obtained by using a polyvinyl alcohol resin as a support material is used in combination with the molding material according to the present invention, precise molding of complex cavities and shapes is safe and easy since the adhesion between both materials is excellent.

Usually, an alkaline solvent or an organic solvent is used for removing the support material. However, since the adhesion between the molding material containing the EVOH according to the present invention and the molding material obtained by using a polyvinyl alcohol resin is good, in a case where the molding material obtained by using a polyvinyl alcohol resin is used as a support material, there are advantages that a good molded product is obtained, and the support material in the molded product can be safely dissolved and removed with water.

As a method of the dissolution and removal, the laminate may be immersed in water or warm water contained in a container, or may be rinsed off with running water. In the case of immersion, it is preferable to stir the solution or apply ultrasonic waves to shorten the removal time, and the water temperature is preferably about 25° C. to 90° C. For the dissolution and removal, water or warm water of about 10 to 10,000 times is usually used with respect to the weight of the support material. The treatment time is usually 10 minutes to 3 hours, and preferably 30 minutes to 2 hours.

The molding material according to the present invention is characterized by selecting the EVOH. Since the EVOH has a lower molecular weight and a lower melt tension than other thermoplastic resins, those skilled in the art usually consider that it is inappropriate since the resin cannot be laminated as designed when used in the hot melt lamination method. However, the inventors of the present invention focus on the crystallinity of the EVOH. Since the EVOH has a high crystallization rate, molding can be achieved without unexpected shape deformation. Further, the EVOH can be easily surface-treated with an alcohol, a water/alcohol mixed solvent or the like, and there is no need to use an alkaline solvent or an organic solvent. As such an alcohol, an aliphatic alcohol having 1 to 4 carbon atoms such as ethanol, methanol, and propanol can usually be used.

In addition, since the molding material containing the EVOH according to the present invention has abundant hydroxyl groups, the surface of the obtained molded product is hydrophilic and excellent in biocompatibility. Therefore, the molding material is suitable for medical and hygiene members such as hearing aids adapted to the physical shape of the individual, dentures, artificial teeth, artificial joints, contact lenses, and medication administration instruments.

Further, since the EVOH of the present invention has a gas barrier property of gas molecules, the molded product obtained by using the molding material containing the EVOH according to the present invention is suitable for food packaging containers or storage containers that keep freshness by blocking radicals such as gaseous oxygen, and fuel containers for volatile fuels such as gasoline.

EXAMPLES

Hereinafter, the present invention will be described more specifically with reference to Examples, but the present invention is not limited to the Examples unless it goes beyond the gist thereof. In Examples, "Part" means part based on mass.

(Evaluation Items)
<3D Printer Moldability>

A rectangular parallelepiped molded product 10 shown in FIG. 1 molded with an FDM (Fused Deposition Modeling) type dual head 3D printer was evaluated for the following molding evaluation (three-dimensional moldability, shape stability, and delamination property).

[Three-Dimensional Moldability]

It was evaluated that whether the main resin and the support resin can be drawn three-dimensionally on a platform (adhesion 1), whether the main resin can be drawn three-dimensionally on the support resin (adhesion 2), and whether the support resin can be drawn three-dimensionally on the main resin (adhesion 3).

Adhesion 1) Appropriate application of a main resin layer 1 and a first support resin layer 2a to a platform 3

Adhesion 2) Appropriate application of the main resin layer 1 to the first support resin layer 2a Adhesion 3) Appropriate application of a second support resin layer 2b to the main resin layer 1

The evaluation criteria are as follows. In a case where the evaluation is "A" or "B", three-dimensional molding can be achieved, so it can be evaluated as no problem level (good) for practical use.

A: Three-dimensional molding can be achieved. The adhesion force between members is also strong, and the members cannot be easily peeled off by hand.

B: Three-dimensional molding can be achieved. The adhesion force between members is also weak, and the members can be easily peeled off by hand.

C: There is a part where three-dimensional molding cannot be achieved.

D: Three-dimensional molding cannot be achieved.

[Shape Stability]

The obtained molded product 10 was visually evaluated.

1) Sharpness of Corner

The evaluation criteria are as follows.

A: A corner is formed at 90°.

B: A corner is confirmed.

C: There is a round corner.

D: The corner deforms.

2) Shrinkage and Deformation

The appearance of the molded product design data (rectangular parallelepiped) input in the 3D printer was compared with the appearance of the obtained molded product 10, and shrinkage and deformation were evaluated according to the following evaluation criteria. Such shrinkage and deformation is a phenomenon caused by molding with the 3D printer.

A: The shape is retained and there is no shrinkage.

B: Shrinkage is slight, but the shape is retained.

C: Deformation of the shape is recognized.

D: The shape changes greatly and deformation is recognized.

[Delamination Property after Molding]

The presence or absence of delamination in the main resin layer 1 of the molded product 10 was visually confirmed. The evaluation criteria are as follows.

A: There is no interface in the main resin layer and the layers are integrated.

B: Layers can be confirmed.

C: A part of layers are peeled off.

D: The layers are completely peeled off

[Delamination Property Under High Humidity]

After allowing the molded product 10 to stand for 5 hours in an environment of 40° C. and 90% RH, delamination in the main resin layer 1 was visually confirmed. The evaluation criteria are as follows.
- A: There is no interface in the main resin layer and the layers are integrated.
- B: Layers can be confirmed.
- C: A part of layers are peeled off.
- D: The layers are completely peeled off <Surface Treatment Property>

A main resin was used to prepare a donut-shaped packing (diameter 15 cm, inner circle cavity diameter 5 cm, thickness 5 mm) with an FDM type dual head 3D printer and the following treatment was applied to the donut-shaped packing.

A mixed solution of water/isopropyl alcohol (volume ratio=1/2) was placed in a bottom portion that does not contact a perforated plate of a glass container (capacity 900 ml) having the perforated plate in the middle of the container, and the donut-shaped packing was allowed to stand on the perforated plate. The glass container was treated with a hot bath at 85° C. for 60 minutes. On the surface of the obtained donut-shaped packing, a case where a lamination part (interlayer line) of the main resin in the donut-shape packing disappeared was evaluated as "B", and a case where the lamination part did not disappear was evaluated as "D".

Example 1

A saponified ethylene-vinyl acetate copolymer having an ethylene content of 32 mol %, a saponification degree of 99.6 mol % and an MFR of 3 g/10 min under 210° C. (a load of 2,160 g) was used to prepare an EVOH filament of 1.75 mmφ under the following conditions.
- Extruder: manufactured by TECHNOVEL CORPORATION 15 mmφ L/D=60
- Extrusion temperature (° C.): C1/C2/C3/C4/C5/C6/C7/C8/D=150/170/180/190/200/210/230/230
- Rotation speed: 200 rpm
- Discharge amount: 1.5 kg/hr.

A commercially available PVOH support filament (MELFIL8164AVE (manufactured by Verbatim)) was used.

The EVOH filament was used as the main resin and the commercially available PVOH support filament was used as the first and second support resins, so as to prepare the molded product 10 shown in FIG. 1 with an FDM type dual head 3D printer (FDM200HW-X manufactured by Ninjabot Company) under the following conditions.
- Temperature of the head portion (nozzle temperature) in the laminate molding apparatus: 220° C.
- Lamination pitch: 200 μm The 3D printer moldability of the obtained molded product was evaluated. The results are shown in Table 1.

In addition, the EVOH filament as the main resin was used to prepare a donut-shaped packing (diameter 15 cm, inner circle cavity diameter 5 cm, thickness 5 mm) with an FDM type dual head 3D printer (FDM200HW-X manufactured by Ninjabot Company) under the following conditions.
- Temperature of the head portion (nozzle temperature) in the laminate molding apparatus: 220° C.
- Lamination pitch: 200 μm The surface treatment property of the obtained donut-shaped packing was evaluated. The results are shown in Table 1.

Example 2

A molded product and a donut-shaped packing were prepared as in Example 1, except that a saponified ethylene-vinyl acetate copolymer having an ethylene content of 44 mol %, a saponification degree of 99.6 mol % and an MFR of 3 g/10 min under 210° C. (a load of 2,160 g) was used as the main resin, and the nozzle temperature during lamination molding was set to 210° C. Then, the evaluations were performed. The results are shown in Table 1.

Example 3

A molded product and a donut-shaped packing were prepared as in Example 1, except that a saponified ethylene-vinyl acetate copolymer having an ethylene content of 38 mol %, a saponification degree of 99.6 mol % and an MFR of 3 g/10 min under 210° C. (a load of 2,160 g) was used as the main resin, and the nozzle temperature during lamination molding was set to 210° C. Then, the evaluations were performed. The results are shown in Table 1.

Example 4

A molded product and a donut-shaped packing were prepared as in Example 1, except that a saponified ethylene-vinyl acetate copolymer having an ethylene content of 29 mol %, a saponification degree of 99.6 mol % and an MFR of 3 g/10 min under 210° C. (a load of 2,160 g) was used as the main resin, and the nozzle temperature during lamination molding was set to 230° C. Then, the evaluations were performed. The results are shown in Table 1.

Comparative Example 1

A molded product and a donut-shaped packing were prepared as in Example 1, except that an acrylonitrile-butadiene-styrene copolymer resin (ABS) filament (Takumi brand filament manufactured by Mijinko) was used as the material of the main resin. Then, the evaluations were performed. The results are shown in Table 1.

Comparative Example 2

A molded product and a donut-shaped packing were prepared as in Example 1, except that a polylactic acid resin (PLA) filament (Takumi brand filament manufactured by Mijinko) was used as the material of the main resin. Then, the evaluations were performed. The results are shown in Table 1.

Comparative Example 3

A molded product and a donut-shaped packing were prepared as in Example 1, except that a polyamide resin filament (Takumi brand filament manufactured by Mijinko) was used as the material of the main resin. Then, the evaluations were performed. The results are shown in Table 1.

TABLE 1

| | | 3D printer moldability | | | | | | |
|---|---|---|---|---|---|---|---|---|
| | | Three-dimensional moldability | | | Shape stability | | Delamination | Delamination | Surface |
| | Resin | Adhesion 1 | Adhesion 2 | Adhesion 3 | Sharpness of corner | Shrinkage and deformation | property after molding | property under high humidity | treatment property |
| Example 1 | EVOH having ethylene content of 32 mol % | A | A | A | A | A | A | B | B |
| Example 2 | EVOH having ethylene content of 44 mol % | A | A | A | B | B | A | A | B |
| Example 3 | EVOH having ethylene content of 38 mol % | A | A | A | B | B | A | A | B |
| Example 4 | EVOH having ethylene content of 29 mol % | A | A | A | A | A | A | B | B |
| Comparative Example 1 | ABS resin | B | C | D | C | D | A | A | D |
| Comparative Example 2 | PLA resin | B | C | C | A | A | A | A | D |
| Comparative Example 3 | Polyamide resin | B | C | C | B | B | A | A | D |

In the examples using the molding material according to the present invention, the three-dimensional moldability evaluations thereof were all good. In addition, regarding the shape stability, corners of all the molded products could be formed, and there was a good tendency particularly in Examples 1 and 4. Further, regarding the delamination property after molding, there was no layer peeling, and in the case of being exposed to severe conditions such as under high humidity not usually exposed, there was a good tendency particularly in Example 2 and Example 3.

Furthermore, regarding the surface treatment property, Examples 1 to 4 could be treated satisfactorily using a water/alcohol solvent which is safe in handling. The ABS resin, the PLA resin, and the polyamide resin used in Comparative Examples were not surface-treatable with a water/alcohol solvent. These resins can be subjected to surface treatment using, for example, organic solvents such as acetone or gresol, or alkaline solvents. However, safety concerns arise when these solvents are used, so it can be seen that the molding material according to the present invention is excellent in safety.

While the present invention has been described in detail and with reference to specific embodiments, it will be apparent to those skilled in the art that various changes and modifications can be made without departing from the spirit and scope of the invention. This application is based on the Japanese patent application (Japanese patent application No. 2016-242870) filed on Dec. 15, 2016, the contents of which are incorporated herein by reference.

INDUSTRIAL APPLICABILITY

Since the molding material according to the present invention is excellent in dimensional stability and operation safety during surface treatment after molding by using the EVOH, a molded product molded by such a molding material is suitable for medical and hygiene members such as hearing aids and medication administration instruments, food packaging containers or storage containers, and fuel containers for volatile fuels such as gasoline.

REFERENCE SIGNS LIST

1 Main resin layer
2a First support resin layer
2b Second support resin layer
3 Platform
10 Molded product

The invention claimed is:

1. A molding material for use in molding by a hot melt lamination method, the molding material comprising:
    an ethylene-vinyl alcohol copolymer; wherein
    a content of the ethylene-vinyl alcohol copolymer in the molding material is 50 mass % or more,
    the molding material is in the shape of a filament, and
    a content of an ethylene structural unit in the ethylene-vinyl alcohol copolymer is 20 mol % to 50 mol %.

2. The molding material according to claim 1,
    wherein the content of the ethylene structural unit in the ethylene-vinyl alcohol copolymer is 25 mol % to 45 mol %.

3. A molded product, formed from the molding material according to claim 1.

4. A method for producing a molded product, the method comprising:
    melting the molding material according to claim 1 to form a melted molding material;
    extruding the melted molding material to form an extruded melted molding material; and
    laminating the extruded melted molding material to obtain a molded product.

5. The method for producing a molded product according to claim 4, further comprising:
    surface treating the molded product with at least one selected from the group consisting of water, an alcohol, and a mixed solvent thereof.

6. A method of using an ethylene-vinyl alcohol copolymer as a molding material in a hot melt lamination method; wherein
    a content of the ethylene-vinyl alcohol copolymer in the molding material is 50 mass % or more,
    the molding material is in the shape of a filament, and
    a content of an ethylene structural unit in the ethylene-vinyl alcohol copolymer is 20 mol % to 50 mol %.

7. The molding material according to claim 1, wherein a filament diameter of the molding material is 0.1 mm to 5 mm.

* * * * *